United States Patent [19]

Jones

[11] Patent Number: 4,907,403
[45] Date of Patent: Mar. 13, 1990

[54] GRASS MOWER IMPROVEMENT

[76] Inventor: Otis Jones, 1577 Waite St., Gary, Ind. 46404

[21] Appl. No.: 306,996

[22] Filed: Feb. 6, 1989

[51] Int. Cl.$^4$ .................. A01D 34/12; A01D 34/48; A01D 34/70; A01D 35/035
[52] U.S. Cl. ........................................ 56/202; 56/16.6
[58] Field of Search .................. 56/202, 203, 320.2, 56/16.6, 12.8–13.4

[56] References Cited

U.S. PATENT DOCUMENTS

| | | | |
|---|---|---|---|
| 2,955,404 | 10/1960 | Strasel et al. | 56/202 |
| 3,006,128 | 10/1961 | Weiland | 56/194 |
| 3,199,277 | 8/1965 | Moody | 56/25.4 |
| 3,890,772 | 6/1975 | Seifert et al. | 56/202 |
| 3,961,467 | 6/1976 | Carpenter | 56/202 |
| 3,971,198 | 7/1976 | Lane | 56/16.6 |
| 3,974,631 | 8/1976 | Rhodes | 56/202 |
| 4,095,398 | 6/1978 | Aumann et al. | 56/202 |
| 4,158,280 | 6/1979 | Thomas et al. | 56/202 |
| 4,168,600 | 9/1979 | Klug et al. | 56/202 |
| 4,310,998 | 1/1982 | Cuba | 56/202 |
| 4,377,063 | 3/1983 | Leaphart | 56/202 |
| 4,470,246 | 9/1984 | Donegan | 56/202 |
| 4,476,668 | 10/1984 | Reilly | 56/202 |
| 4,522,019 | 6/1985 | Edwards et al. | 56/202 |
| 4,723,398 | 2/1988 | Flenniken et al. | 56/202 |
| 4,738,088 | 4/1988 | Klever et al. | 56/202 |

OTHER PUBLICATIONS

Sears advertisement for 44-Gal. Trash Can with Bonus Apron in The Washington Post on Wednesday, Sep. 27, 1989.
Snapper Pac-n-Sac Catcher Kit No. 6-0664 Operating Instructions 1-5410 (3/86).

Primary Examiner—Jerome W. Massie
Assistant Examiner—Gay Spahn
Attorney, Agent, or Firm—Richard G. Kinney

[57] ABSTRACT

An improved grass mower and attachment which employs a sling for holding a disposable bag is disclosed. The sling is open to one side so that full bags can be unloaded without lifting. The sling is mounted to a frame which receives the margin of the bag and this frame is mounted so that it can both pivot downward (when unlatched) and slide rearward relative to a housing from which clippings are delivered to the bag during grass cutting. When the bag is desired to be unloaded, the frame is unlatched and the sling, which is otherwise held above the ground, pivots its open side down to the ground. The housing can slide from over the frame by advancing the mower. The filled bag can be then tied and rolled out of the sling onto the ground without lifting it. A new bag can be fitted to the frame, inside the sling, and the lightweight frame, sling and empty bag returned and relatched under the housing and the mower used to fill the new bag.

11 Claims, 2 Drawing Sheets

GRASS MOWER IMPROVEMENT

FIELD OF THE INVENTION

The present invention is directed to a new and improved grass mower attachment and is especially concerned with such an improved attachment for a mower which attachment mounts plastic and the like disposable bags to the mower, so as to receive and hold grass clippings generated by the mower during use.

BACKGROUND OF THE INVENTION

Lawn mowers, and especially powered lawn mowers, are often equipped with attachments including compartments or bags for receiving and storing grass clippings and the like which are propelled out of the operating mower. U.S. Pat. Nos. 4,522,019; 4,158,280; 3,006,128; and 2,955,404 show examples of such mower attachments.

It has also been recognized that it is desirable to store the clippings, etc. in disposable plastic and like bags. See, for example, U.S. Pat. Nos. 4,095,398, 3,199,277 and the Snapper brand Pac-N-Sac Catcher Owner Manual No. 1-5410 (3/86) published by Snapper Power Equipment, McDonough, Georgia, 30253.

Such prior art mower attachments for use with plastic bags, while generally effective, have suffered from some drawbacks. They are difficult to load with a new bag and often require disassembly of parts from the mower. And they provide even more difficulties when it comes to unloading a full and often heavy plastic bag which is filled with grass clippings and the like.

SUMMARY OF THE INVENTION

The present invention comprises a sling-like holder for the disposable bag, which sling is open to one horizontal direction, such as the rear of a lawn mower. The bag is held in the sling above the ground in normal use and filled by clippings propelled from the mower to its upward opening mouth. When it is desired to remove a full or partly filled bag, the mounting for the sling and bag is released so that the bottom of the sling drops to the ground and the bag (preferably after its mouth has been tied closed) may be rolled out (e.g., to the rear) and need not be lifted at all.

By choosing an appropriate spot (e.g. a homeowner's garbage pickup area) at which to unroll the full bag, it may not need to be lifted at all by the user.

When the bag is free of the sling, an empty bag may be re-secured in the sling and the sling holder raised up and latched in its operational position to collect more clippings from the mower as it is used again to mow a lawn.

The invention, together with the advantages thereof, may best be understood by reference to the following description taken in connection with the accompanying drawings, in the several figures of which like reference numerals identify like elements.

DETAILED DESCRIPTION OF THE PREFERRED EMBODIMENT

Figure 1:
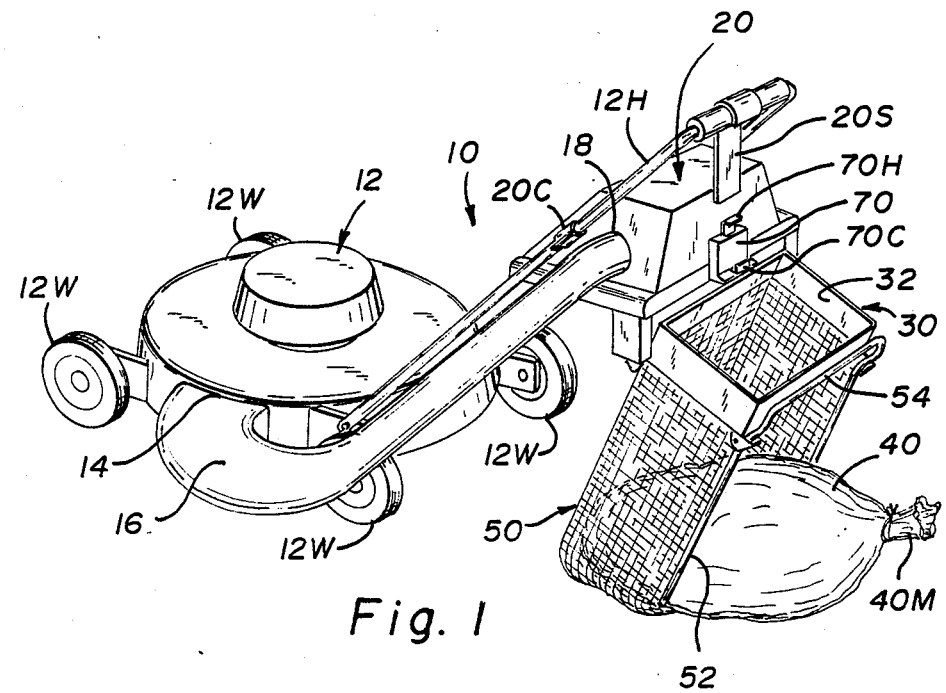
FIG. 1 is a perspective view of a mower including an attachment constructed in accordance with the present invention, illustrating a filled plastic bag being unloaded.

Referring to FIG. 1, there is depicted a mower and attachment which is constructed in accordance with the principles of the present invention and is generally designated by the number 10. The mower and attachment 10 includes a more-or-less conventional powered rotary mower 12. The mower 12 has a side exit port area 14 from which clippings are expelled when the mower is in operation. The mower 12 moves on the ground on four conventional wheels 12W and has a handle 12H of an inverted U shape. The mower 12 may be entirely conventional and thus need not be described in detail here.

Although we have illustrated the invention with a powered rotary mower, it may equally be used with most types of mowers in common use and may be easily adapted to any known hand-guided or rider mower.

In accordance with the present invention, connected to the exit area 14 of the mower 12 is a tubular guide 16 which guides propelled air and clippings from the exit area 14 to an elevated position 18, whereat the guide 16 opens into a baffle housing 20.

The housing 20 is mounted securely to the handle 12H by conventional means such as a strap 20S and clips 20C. As these mounts may be entirely conventional and well within the skill of the worker in this field, we do not detail them here. Any conventional mounts may be used so long as they securely hold the housing 20 to the handle 12H.

Figure 2:
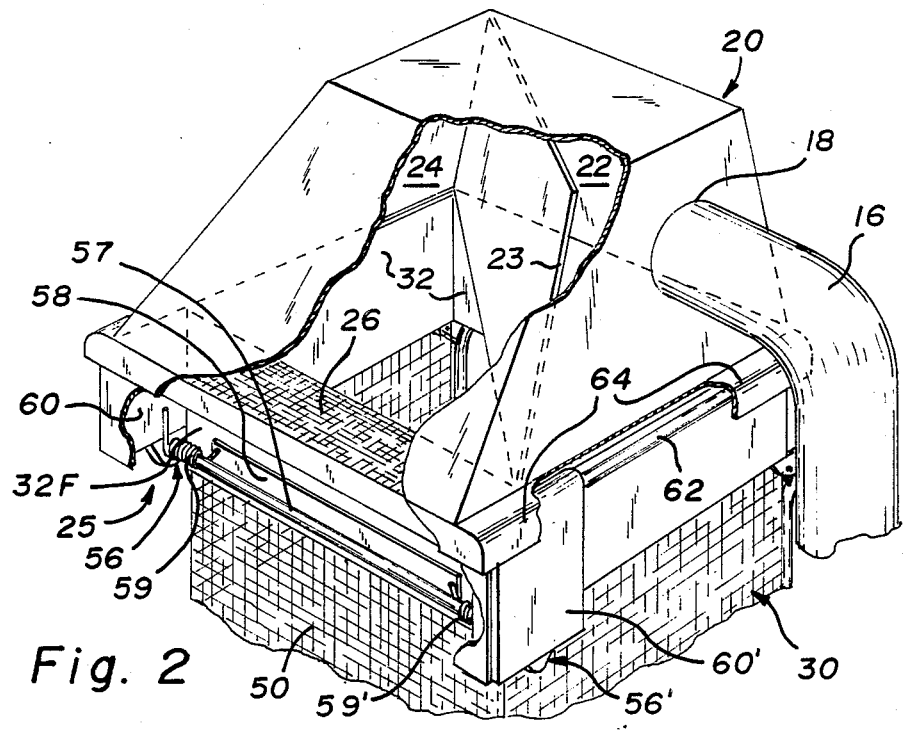
FIG. 2 is a detailed perspective view of a portion of the mower and attachment of FIG. 1, with parts broken away to show interior parts.

The housing 20, as better shown in FIG. 2, defines a first volume 22 which receives the propelled air and clippings from the tube 16 and is open to the bottom. An internal wall 23 divides the housing 20 and separates the volume 22 from a second volume 24, also open to the bottom.

In use, air and entailed clippings are propelled into the volume 22 from the tube 16. The clippings and air exit volume 22 from its bottom. As will be explained more below, in use, the air and clippings thereafter enter the mouth of a disposable plastic bag, and the clippings being heavier than air tend to stay in the bag. The air exits out of a portion of the mouth of the bag under the volume 24 and the air enters that volume and exits downward through an opening 25 covered by a screen 26. This opening 25 is at the forward end of the housing 20 and thus the air and any items which may be propelled with it and make it past the baffle and screen 26 are propelled away from the user, who, of course, stands and walks behind the handle 12H during use of the mower 12 to cut grass.

In accordance with a principal feature of the present invention, a bag mounting apparatus 30 is provided. The bag mounting apparatus 30 includes a generally rectangular frame 32 over the marginal opening portion 40M of a disposable plastic bag 40 or 40'.

The frame 32 is mounted to the housing 20 by means of a pivotable mounting 56, 56' at its forward end. This mounting includes a rod 57 which is welded or otherwise secured to a plate 58, which is in turn secured to the front member 32F of the frame 32 as shown in FIG. 2. A pair of torsion springs 59, 59' serve to urge the frame 32 to pivot upward and to counter somewhat the tendency of gravity to pivot the frame downward about the rod 57.

The opposite ends of the rod 57 are received for rotation in depending slide members 60, 60' which are each mounted for front to back sliding (on rods such as the rod 62, FIG. 2, mounted at the sides of the housing 20 to said housing and preferably covered by a shirt member 64). This sliding mounting allows the frame 32 to move between the position shown in FIG. 2, wherein it is aligned under the two volumes 22, 24 (but not under the screen 26 and in substantially airtight contact with the housing along at least the frame's rear and sides), to the position shown in FIGS. 1, 4, 5, 6 and 7, where it is exposed and accessible at the rear of the housing 20.

Figure 4:
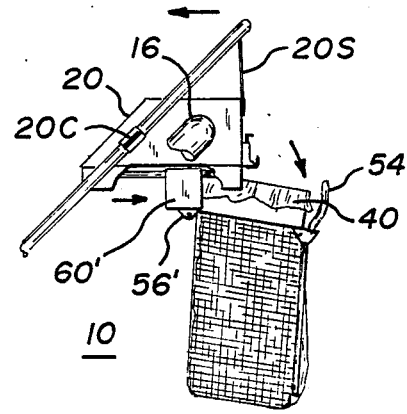
Figure 5:
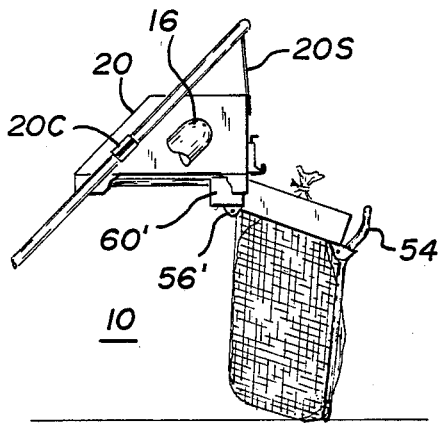
Figure 6:
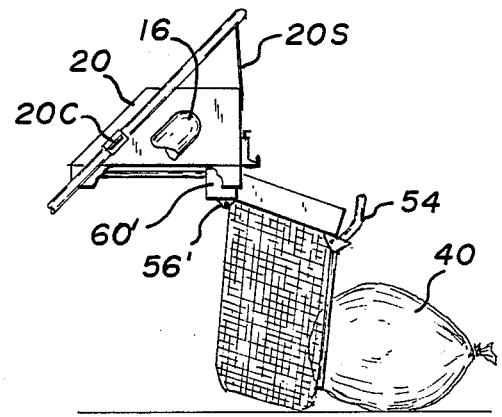

As mentioned above, the springs 59, 59' are strong enough to approximately counter the weight of the frame 32, sling 50, and empty bag 40 or 40'. However, a loaded bag in the sling 50 and frame 32 will cause the frame 32 to pivot downward (as shown in FIGS. 4 to 6). To prevent this happening prematurely and to hold the slide members 60, 60' in their forward operational position (FIGS. 2, 3 and 8), a manually-operable latch 70 is provided at the rear of the housing 20. This latch 70 serves to releasably captivate the handle 54 when the frame 32 is aligned under the housing 20 (as shown best in FIGS. 2, 3 and 8). When in this alignment the frame and bag open upwardly with the frame delivering the mouth or opening of the bag to the bottom of volumes 22 and 24. The frame 32 also serves to mount a sling 50 which in accordance with the present invention is open at one side or horizontal direction. This open side is, as best shown in FIG. 1, preferably the rearward side.

The sling 50 is preferably made primarily of flexible but non-elastic material such as heavy canvas, although it may be of other material such as nylon netting and may in some applications be made of even more rigid materials. The rear side opening is preferably defined by and reinforced by a generally inverted U-shaped aluminum tubing frame 52 (FIG. 1) secured to the rear corners of the frame 32 and which also serves to mount a rearward handle 54. The ends of the handle 54 are pivotally mounted to the frame 52. The handle 54 aids in securing and releasing the frame 32 and sling 50 to the housing 20, as will be explained below.

The frame 52 is secured to the sling in any convenient manner such as by having the canvas sling sewn into a conformingly sized and shaped sleeve and passing the frame 52 through that sleeve.

While any latch mechanism will work so long as it is strong enough to hold up under a loaded bag in the sling 50, a spring latch mechanism such as shown in FIGS. 1 and 3-8 is preferred. (By pushing down the top 70H of the latch 70, the bottom catch 70C is lowered and allows the handle 54 to leave or enter. The handle 54 is pivotally mounted to move over a small angle. A spring mechanism pushes the top 70H and catch 70C upward to hold the handle 54 and thus to hold the frame 32 against the underside of the housing 20.)

Figure 3:
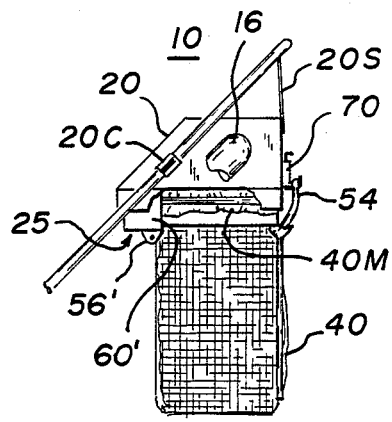
FIGS. 3–8 are partial side elevational views of part of the mower and attachment (with parts broken away), illustrating successive steps in the unloading process and reloading process, all in accordance with the present invention.

As mentioned above, when the mower is in use, the framework is latched forward and up against the housing 20 with the marginal portions 40M of the mouth of the bag 40 over the upper edge of the frame 32 as shown in FIG. 3. While in use and cutting grass, the mower 12 propels air and clippings through the guide 16 into the first chamber or volume 22 of the housing. The only exit from that volume is downward and into the mouth of the bag 40. The air flow is reversed in the bag to flow upward to the second chamber or volume 24 of the housing 20 and thence downward through the screen 26 and downward and out the hood formed by members 60, 60' and the vertical rear wall between them. The clippings accumulate in the bag 40 and when that bag is loaded, the user will wish to change bags.

Unloading a Full Bag

This is accomplished (preferably when the mower 10 is at a place where the filled bags are to be left) by the following steps. The top 70H of the latch mechanism is pushed downward. This moves the catch 70C (FIG. 1) downward and allows the handle 54 to leave the catch 70C and the sling 50, to move down so that its bottom hits the ground. The bottom of the side opening of the sling 50 is also moved to or nearer the ground. At this point, the mower can be moved forward (FIG. 5) to expose the entire frame 32 and bag margin 40M to the user standing behind the mower and attachment 10.

The bag margin 40M is preferably tied at this point (FIG. 5) and the bag pushed backward under the frame 32 and out of the rear opening of the sling 50 (FIGS. 1 and 6). As the bottom of the side opening is almost ground level it presents no obstacle to the bag 40 and the weight of the filled bag (or slight downward pressure on the handle 54 by the user) moves the bottom of the tubing frame 52. The user may easily roll the full bag 40 backward so that it is substantially out of the sling 50 (FIG. 6) and then advance the mower and attachment 10 so that the sling 50 is free of the bag 40.

The tubular frame 52 serves to define the side opening from the sling and also serves to keep up the frame 32 and permit it from pivoting too far in the downward direction where it might interfere with the removal of the bag 40.

Reloading A Bag

Figure 7:
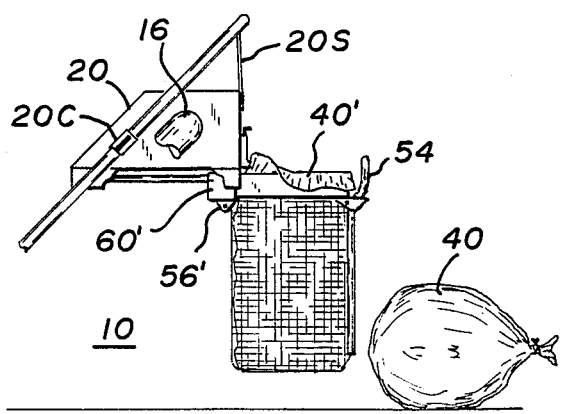
Figure 8:
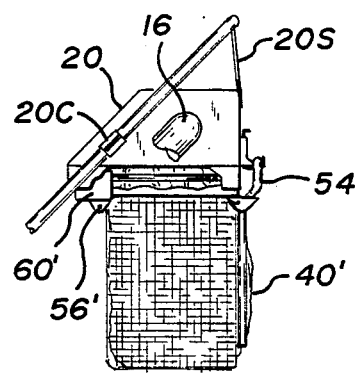

When the empty sling 50 is free of the old bag 40, the frame 32 and sling 50 are returned (by the springs 59, 59') to approximately the position shown in FIG. 7 and a new bag 40' may be installed. The frame 32, sling 50, and new bag 40' are then slid forward under the housing 20 and the latch 70 used to again latch the handle 54 (FIG. 8).

It should now be appreciated that an easily used apparatus and method for unloading and loading disposable bags from a lawn mower has been described and depicted. The changeable bags are preferably plastic and sized to fill the sling 50.

A prototype of the invention has been constructed, tested and shown to work well. This prototype used a frame 32 of about 16 inches by 16 inches in overall size and a sling of about 14 inches by 16 inches by 24 inches. Standard disposable plastic bags of 30 gallon size (2 feet 6 inches × 2 feet 10 inches × 1.3 mil) were used in this sling and worked well. The housing 20 was constructed of lightweight foam plastic in the prototype but thin wall plastic or lightweight metal is presently preferred. The prototype was installed on a lawn mower made by Sears Craftsman, Model Number 13197330, and worked well.

While one particular embodiment of the invention has been shown and described, it will be obvious to those skilled in the art that changes and modifications may be made without departing from the invention, and, therefore, the aim in the appended claims is to cover all such changes and modifications as fall within the true spirit and scope of the invention.

I claim:

1. In combination with a lawn mower of the type which is designed to be moved over the ground and wherein clippings are propelled through an exit port, a disposable bag mounting apparatus coupled to receive the clippings propelled from the exit port and hold a disposable bag, comprising:

means coupled to the exit port for guiding the clippings to an elevated position on the mower;

a sling sized and shaped for receiving the disposable bag, said sling having an upper area defining an upward facing opening and a bottom portion and said sling being substantially open to one horizontal direction when in its operational position and in its unloading position so that a filled disposable bag may be moved out of said sling in that direction and through said open side;

means for releasably securing the disposable bag with its open end positioned in an upwardly opening configuration at said upward facing opening of the upper area of said sling with the disposable bag's main closed body depending downward in said sling;

means for mounting said sling and the disposable bag therein in an operational position to said mower wherein the open end of the bag is under said elevated position so as to receive clippings propelled by the mower during operation through the exit port to said elevated position into said disposable bag in said sling, wherein the clippings are collected and held, said means for mounting said sling also supporting said sling when in this operational position such that the bottom of said sling clears the ground in normal use, said mounting means further allowing the bottom of said sling to be selectively lowered to the ground to assume an unloading position such that the disposable bag may be unloaded therefrom by rolling it out of the substantially open horizontal direction of said sling, and wherein thereafter said sling may be returned to its operational position.

2. The combination of claim 1, wherein said sling is made of a flexible but strong and substantially inelastic material and encloses a bag mounted therein on all sides except for the substantially open horizontal direction side.

3. The combination of claim 2 wherein said sling open side has a bottom edge to said horizontal opening which edge is held a short distance above ground when the sling is mounted in an operational position, but is lowered to approximately the ground level when in the unloading position.

4. The combination of claim 1 wherein said bag mounting apparatus further includes a baffle housing having a front, said housing being mounted to the mower at said elevated position and receiving the clippings from said guiding means, said baffle housing being open to the bottom and to said sling and the open end of said bag when in said operational position, said housing being so constructed as to cause flow from said guide means down into the bag opening and upward from said bag opening to an exit from said housing at the front of said housing, said exit directing flow downward from the housing, whereby clippings tend to accumulate in the bag during operation of the mower, and the flow which does not so accumulate is directed forward of the housing, and wherein said sling is made of a flexible but strong and substantially inelastic material and encloses a bag mounted therein on all sides except for the substantially open horizontal direction side.

5. The combination of claim 4, wherein said mounting means for said sling and releasably securing means for said bag includes a generally horizontal open frame over which the margin of the bag may be folded which frame is pivotally mounted at the side opposite the open side of said sling whereby the sling may be lowered to the ground by pivoting downward the frame.

6. The combination of claim 4, wherein:

said frame pivotally mounted is slidable in a horizontal direction for a short distance, whereby the frame can be moved relative to said housing between a position wherein it is substantially under said housing to a position wherein it is substantially aside said housing and accessible for securing and removing a bag from said frame.

7. The combination of claim 6, wherein said mounting means includes a manually releasable latch for securing said frame under said housing.

8. In combination with a lawn mower of the type which is designed to be moved over the ground and wherein clippings are propelled through an exit port, a disposable bag mounting apparatus coupled to receive the clippings propelled from the exit port and hold a disposable bag, comprising:

means coupled to the exit port for guiding the clippings to an elevated position on the mower;

a sling sized and shaped for receiving the disposable bag, said sling having an upper area defining an upward facing opening and a bottom portion and said sling being substantially open to one horizontal direction when in its operational position and in its unloading position so that a filled disposable bag may be moved out of said sling in that direction and through said open side;

means for releasably securing the disposable bag with its open end positioned in an upwardly opening configuration at said upward facing opening of the upper area of said sling with the disposable bag's main closed body depending downward in said sling;

means for mounting said sling and the disposable bag therein in an operational position to said mower wherein the open end of the bag is under said elevated position so as to receive clippings propelled by the mower during operation through the exit port to said elevated position into said disposable bag in said sling, wherein the clippings are collected and held, said means for mounting said sling also supporting said sling when in this operational position such that the bottom of said sling clears the ground in normal use, said mounting means further allowing the bottom of said sling to be selectively lowered to the ground to assume an unloading position such that the disposable bag may be unloaded therefrom by rolling it out of the substantially open horizontal direction of said sling, and wherein thereafter said sling may be returned to its operational position;

wherein said bag mounting apparatus further includes a baffle housing having a front, said housing being mounted to the mower at said elevated position and receiving the clippings from said guiding means, said baffle housing being open to the bottom and to said sling and the open end of said bag when in said operational position, said housing being so constructed as to cause flow from said guide means down into the bag opening and upward from said bag opening to an exit from said housing at the front of said housing, said exit directing flow downward from the housing, whereby clippings tend to accumulate in the bag during operation of the mower, and the flow which does not so accumulate is directed forward of the housing, and wherein said sling is made of a flexible but strong and substantially inelastic material and encloses a bag mounted therein on all sides except for the substantially open horizontal direction side;

wherein said frame pivotally mounted is slidable in a horizontal direction for a short distance, whereby the frame can be moved relative to said housing between a position wherein it is substantially under said housing to a position wherein it is substantially aside said housing and accessible for securing and removing a bag from said frame;

wherein said mounting means includes a normally releasable latch for securing said frame under said housing; and wherein said frame is mechanically biased to pivot upward.

9. The combination of claim 7 wherein said opening of said sling is defined by a ridged opening-defining frame.

10. Apparatus for retrofitting to a lawn mower of the type which is designed to be moved over the ground and wherein clippings are propelled through an exit port, said apparatus serving to receive a disposable bag mounting, comprising:

means couplable to the exit port area for guiding the clippings to an elevated position on the mower;

a sling sized and shaped for receiving the disposable bag, said sling having an upper area defining an upward facing opening and a bottom portion and said sling being substantially open to one horizontal direction when in its operational position and in its unloading position so that a filled disposable bag may be moved out of said sling in that direction and through said open side;

means for releasably securing the disposable bag with its open end positioned in an upwardly opening configuration at said upward facing opening of the upper area of said sling with the disposable bag's main closed body depending downward in said sling;

means for mounting said sling and the disposable bag therein in an operational position to said mower wherein the open end of the bag is under said elevated position so as to receive clippings propelled by the mower during operation through the exit port to said elevated position into said disposable bag in said sling, wherein the clippings are collected and held, said means for mounting said sling also supporting said sling when in this operational position such that the bottom of said sling clears the ground in normal use, said mounting means further allowing the bottom of said sling to be selectively lowered to the ground to assume an unloading position such that the disposable bag may be unloaded therefore by rolling it out of the substantially open horizontal direction of said sling, and wherein thereafter said sling may be returned to its operational position.

11. The apparatus of claim 10, wherein said mounting means for said sling and bag includes mechanical bias means for urging the sling and bag upward when in its lowered unloading position toward its operational position.

* * * * *